Patented Jan. 17, 1950

2,494,563

UNITED STATES PATENT OFFICE 2,494,563

BIS(4-AMINOCYCLOHEXYL)METHANE

William Kirk, Jr., Christiana Hundred, Richard S. Schreiber, Wilmington, and Gerald M. Whitman, Claymont, Del., assignors to E. I. du Pont de Nemours & Company, Wilmington, Del., a corporation of Delaware No Drawing. Application January 8, 1947, Serial No. 720,922

1 Claim. (Cl. 260—563)

This invention relates to new compositions of matter and more particularly to new cycloaliphatic diamines.

This application is a continuation-in-part of our copending application, Serial No. 615,912, filed September 12, 1945, now abandoned, which describes the use of ruthenium as a catalyst for the hydrogenation of non-condensed ring polycyclic aromatic diamines to the corresponding cycloaliphatic amines. For this reaction ruthenium is exceptionally selective and efficient. Among the new cycloaliphatic diamines therein disclosed is bis(4-aminocyclohexyl)methane which is liquid at normal temperatures.

It is an object of this invention to provide solid isomeric mixtures and pure isomers of bis(4-aminocyclohexyl)-methane which are useful as intermediates for polyamides having unique molding properties. A further object of this invention is to provide solid isomeric mixtures and pure isomers of bis(4-aminocyclohexyl)-methane yielding polyamides of increased softening point and which injection mold to transparent products having excellent optical properties. Other objects will appear hereinafter.

These objects are accomplished by the following invention which comprises bis(4-aminocyclohexyl)methanes having a freezing point above 40° C. A particularly preferred product is bis(4-aminocyclohexyl)methane having a freezing point between 40° C. and 50° C.

Because of their structural configuration, bis-(4-aminocyclohexyl)methanes can exist in at least three stereoisomeric forms. The ratio of these stereoisomers present in any given sample of bis(4-aminocyclohexyl)methane obtained by hydrogenation of bis(4-aminophenyl)methane with a ruthenium catalyst, can be controlled to a large extent by proper choice of reaction conditions. For example, a product containing a preponderance of lower melting isomers, that is of a mixture of isomers which is liquid at 25° C., is favored by the use of low temperatures, such as 100° to 125° C. and high catalyst concentration such as 2 to 5% ruthenium oxide by weight. On the other hand, production of a product containing a preponderance of higher melting isomers, such as a mixture of isomers which is solid at 25° C. is favored by the use of relatively higher temperatures such as 140° C. to 250° C., at which temperature a low catalyst concentration suffices, such as 0.004 to 0.1% ruthenium oxide by weight although additional catalyst may be used if desired. It has been found that by distillation and redistillation in vacuo of the hydrogenation product there can be obtained isomeric bis(4-aminocyclohexyl)methanes having a freezing point above 40° C.

Although hydrogenation of the bis(4-aminophenyl)methane may be carried out at pressures as low as 500 lbs./in.$^2$, best reaction rates are obtained at pressures in the range of 1500 to 3500 lbs./in.$^2$. Higher pressures than 3500 lbs./in.$^2$, i. e., up to 20,000 to 25,000 lbs./in.$^2$ can be used but without any appreciable advantage either with respect to yield of desired product or material increase in reaction rate. Temperatures in the range of 140° to 250° C. can be used but 150° to 225° C. represents the preferred conditions from the standpoint of reaction rate and yield of desired product. The hydrogenation may be effected in the absence of a solvent, but generally an organic solvent is used and of these cyclohexane, dioxane and the like represent preferred types. Good agitation should be provided either by means of stirrers, rocker mechanisms, and the like.

The ruthenium catalysts may be used in the form of finely divided ruthenium, either in the form of free metal or in the form of its oxides or salts. The ruthenium may be extended, if desired, on a carrier such as charcoal, silica gel, and the like. The extended catalysts may be made by fusing ruthenium or its oxide with sodium peroxide, dissolving the salt, pouring the resulting solution over the extender and drying the impregnated mass. Other methods, however, can be used such as that of U. S. Patent 2,079,404, issued May 4, 1937, or other procedures based on the reduction of a compound of ruthenium in the presence of the extender may be employed.

In a batch-wise method for preparing the mixture of isomeric bis(4-aminocyclohexyl)methanes, a closed reactor is charged with the bis(4-aminophenyl)methane, a volatile organic solvent if desired, and the ruthenium catalyst. The reactor is swept with hydrogen to remove oxygen, pressured with hydrogen to between 500 and 3,500 lbs./in.$^2$, and the reaction mixture heated at 140° to 250° C. The pressure is maintained within the reactor, throughout the reaction period, by periodically injecting hydrogen as needed. After reaction is complete, as evidenced by cessation of hydrogen absorption or longer if desired, the reactor is cooled, opened, the contents discharged, and filtered to separate the catalyst. The mixture of isomeric bis(4-aminocyclohexyl)-methanes is isolated by distillation or other purification methods.

In general, the preparation of bis(4-aminocyclohexyl)methane by the conditions outlined above results in a mixture containing at least two of the three possible geometric stereoisomers of the alicyclic diamine. One of the geometric stereoisomers, freezing point 65.4° C., may be readily obtained in a pure state by conversion to a diacyl derivative, such as the diformyl derivative, recrystallization of the derivative from a suitable solvent, such as ethanol, until free from the accompanying isomers, regeneration of the isomer of bis(4-aminocyclohexyl)methane by hydrolysis, followed by distillation and recrystallization. This pure isomer forms a hydrate having a freezing point of 71° C. Other derivatives, for example, the hydrochloride, sulfate, chloraurate, chloroplatinate, dibenzoyl, diacetyl, picrate and the like, may also be employed for the isolation of this isomer.

This isomer of bis(4-aminocyclohexyl)methane, freezing point 65.4° C., may also be isolated in the pure state by recrystallization of a solid isomer mixture of bis(4-aminocyclohexyl)methane from a suitable inert solvent, such as a mixture of paraffin hydrocarbons boiling in the range of 30° to 75° C., n-hexane, cyclohexane, and the like. Suitable precautions should be taken to prevent exposure of the diamine to the carbon dioxide and water vapor of the air during recrystallization.

Fractional crystallization of normally solid isomer mixtures, when in the supercooled liquid state, may also be employed for partial separation of isomers. Thus, an isomer mixture having a freezing point of approximately 40° C., may be supercooled in the liquid state below this temperature and crystallized, by seeding if necessary, on being held at 20 to 29° C. (room temperature), so that a portion of the dicyclic diamine crystallizes, while the remainder is liquid. On separation of the two phases by centrifugation or filtration, there is obtained a solid diamine mixture having a freezing point of 60.7° C. and a liquid fraction having a freezing point of 18.5° C.

This invention is further illustrated by the following examples in which parts are by weight unless otherwise stated.

Example I

Twenty-five hundred parts of bis(4-aminophenyl)methane, 3620 parts of dioxane (purified by distillation from sodium) and 50 parts of ruthenium dioxide catalyst, are charged into an autoclave equipped with a stirrer. After flushing with nitrogen, the autoclave is pressured with hydrogen to 1000 lbs./in.$^2$, and the reaction mixture is heated with stirring to 150° C. over a period of 3 hours, while the pressure is maintained at 800 to 1500 lbs./in.$^2$, by injection of hydrogen as needed to maintain the pressure at the indicated level. After reaching 150° C., the reaction mixture is held at this temperature under hydrogen pressure with stirring for an additional period of 40 minutes, without appreciable hydrogen absorption. The autoclave is cooled, the contents discharged and the catalyst removed by filtration.

The solvent is removed by distillation in a water-pump vacuum and the dark-colored residue is purified by distillation in vacuo through a 2' column packed with glass helices. After collecting 12.9 parts of foreshot (neutral equivalent 280), there is obtained 2212 parts (83.4% yield) of bis(4-aminocyclohexyl)methane as a colorless syrup which solidifies to a soft, white, crystalline solid on standing, B. P. 126° C./0.5 mm.–133° C./2mm., neutral equivalent 105.9 (calculated value 105.18).

The alicyclic diamine is purified by redistillation in vacuo to yield a fraction (1691 parts) boiling at 117° C./0.8 mm.–122° C./0.9 mm., neutral equivalent 105.5, freezing point ca. 41° C.

Purification by vacuum distillation of bis(4-aminocyclohexyl)methane obtained by hydrogenation of bis(4-aminophenyl)methane with a base metal catalyst yields fractions having freezing points of 40.5° C., 43.5° C., 46.0° C., and 47.5 C.

Example II

Bis(4-aminocyclohexyl)methane, when prepared either by the method of Example I or by the methods which are disclosed in our copending application Serial Number 615,912, filed September 12, 1945, consists of a mixture of at least two of the three possible geometrically stereoisomeric forms. An isomer mixture such as is disclosed in Example I sets completely to a soft, crystalline mass which is normally of no value for the purpose of isomer separation by fractional crystallization. However, such an isomer mixture when in the supercooled liquid state can be frequently crystallized, preferably by seeding, so that a portion of the alicyclic diamine, consisting predominantly of one isomer, is obtained as a solid while the remainder retains its liquid state. By suitable treatment, for example filtration or centrifugation of the alicyclic diamine in this form, it is possible to obtain a partial separation of isomers, which separation is reflected in the freezing point of the products. This process is illustrated in this example as follows:

Four hundred twenty-four and six-tenths parts of bis(4-aminocyclohexyl)methane, consisting of normally solid isomer mixture similar to that described in Example I, is supercooled in the liquid state and crystallized at room temperature (20–29° C.), with seeding, if desired, so that a portion of the diamine crystallizes in the form of a lattice work of needles, the interstices of which are filled with a liquid diamine. Upon attainment of equilibrium a solid fraction is separated by centrifugation amounting to 181.7 parts (42% of total) and having a freezing point of 60.7° C. The remaining liquid fraction amounting to 242.9 parts (57.4% of total) has a freezing point of 18.5° C.

A pure isomer of bis(4-aminocyclohexyl)methane melting at approximately 65° C. can be obtained by the following procedure: 1039.2 parts of bis(4-aminocyclohexyl)methane, consisting of normally solid isomer mixture similar to that described in Example I, is supercooled in the liquid state and crystallized at room temperature (20–29° C.), with seeding, if desired, so that a portion of the diamine crystallizes in the form of a latticework of needles, the interstices of which are filled with a liquid diamine mixture. Upon attainment of equilibrium, a solid fraction is separated by centrifugation amounting to 399.5 parts (38.4% of total) and having a freezing point of 54.7° C. The solid fraction (387 parts) is dissolved in 1400 parts of petroleum ether (boiling point, 30–75° C.), the solution filtered under an atmosphere of nitrogen to remove a small quantity of insoluble material, the clear, colorless filtrate concentrated to a volume of 850 cc. and allowed to crystallize. The diamine, consisting of a white, crystalline solid, is recovered by filtration, taking care to exclude water and carbon dioxide, and dried in vacuo; there is obtained 320 parts of bis(4-aminocyclohexyl)methane melting at 60–62.5° C. After two recrystallizations of the solid diamine from n-hexane in a nitrogen atmosphere free from water vapor and carbon dioxide, there is obtained 263.7 parts of a pure geometric isomer of bis(4-aminocyclohexyl)methane as a white, crystalline solid melting at 64.4–65.7° C.

*Example III*

A liquid isomer mixture of bis(4-aminocyclohexyl)methane is prepared according to Example I of our copending patent application Serial No. 615,912, filed September 12, 1945. Three hundred parts of this isomer mixture is dissolved in 244 parts of 95% ethanol and 300 parts of methyl formate is added to the solution at 40° C. with stirring over a period of 20 minutes. The reaction mixture is held at 40° C. with stirring for 1½ hours and is then allowed to stand at 25° C. for 48 hours. Bis(4-formamidocyclohexyl)methane, which begins to precipitate shortly after addition of the methyl formate, is filtered off, washed with 124 parts of 95% ethanol and dried: weight 150 parts, M. P. 210 to 214° C. After 5 recrystallizations from 95% ethanol the product melts at 219.5 to 220.5° C.

The alicyclic diamine is liberated from its diformyl derivative and purified as follows: A mixture of 320.9 parts of bis(4-formamidocyclohexyl)methane, 595 parts of concentrated hydrochloric acid (sp. g., 1.19), and 600 parts of water is heated under reflux for five hours. The solution is cooled, 800 parts of water is added to dissolve the precipitated diamine hydrochloride, and the diamine precipitated in the form of a white, gelatinous hydrate by the addition of a solution of 288 parts of sodium hydroxide in 600 parts of water. The diamine hydrate is separated from the aqueous solution by extraction with 689 parts of n-butyl alcohol, the butyl alcohol extract washed with 100 parts of water, and the water and n-butyl alcohol removed from the diamine extract by distillation in vacuo. The residual crude diamine is dissolved in 426 parts of anhydrous ether, the ether solution filtered to remove small amounts of inorganic salts, the ether removed from the filtrate by distillation and the diamine residue distilled in vacuo to obtain 224.1 parts of bis(4-aminocyclohexyl)methane as a white, crystalline solid boiling at 130–131° C./0.8 mm.

On recrystallization of the diamine (224.1 parts) from 370 parts of n-hexane (95 mole per cent purity) in a nitrogen atmosphere free from carbon dioxide and water vapor, there is obtained 211.6 parts of a pure geometric isomer of bis(4-aminocyclohexyl)methane, presumed to be the trans-trans isomer, possessing a freezing point (corrected) of 65.4° C. and a capillary melting point (corrected) of 64–65.4° C. This isomer forms a diformyl derivative having a melting point of 219.5° to 220.5° C.

Anal.: Calc'd for $C_{13}H_{26}N_2$: C, 74.22; H, 12.46; N, 13.32; N. E., 105.2. Found: C, 73.62, 73.44; H, 12.44, 12.32; N, 12.95, 13.18; N. E., 105.4, 105.1.

The diamine yields a diacetyl derivative melting at 271–272.8° C., a dibenzoyl derivative melting at 288.2–289° C., and a picrate melting at 263° C. (decomposition).

The polyamide of the pure alicyclic diamine with sebacic acid, when prepared essentially by Method A under Example V, consists of a hard, tough, crystalline, opaque solid with a softening point of 310° C. and intrinsic viscosity 0.70. The polyamide is insoluble in solutions of methanol and chloroform or carbon tetrachloride.

*Example IV*

The mixtures of bis(4-aminocyclohexyl)methanes which freeze above 40° C. produce polyamides which have higher softening points as compared with polyamides made from mixtures of stereoisomers of bis(4-aminocyclohexyl)methane which have lower freezing points. These and other characteristic properties of bis(4-aminocyclohexyl)methanes freezing above 40° C. are illustrated in this and the following example.

To a solution of 1480 parts of bis(4-aminocyclohexyl)methane, prepared essentially as in Example I, in 5530 parts absolute ethanol, is added a hot solution of 1415.7 parts of pure sebacic acid in 5530 parts of absolute ethanol. The solution, which almost immediately begins to deposit the sebacic acid salt of bis(4-aminocyclohexyl)methane, is allowed to cool slowly to room temperature and is then stored overnight at approximately 6° C., to complete the salt precipitation. The salt is filtered off by suction washed with absolute ethanol and dried for 4 days at 50° C.; weight 2877 parts (99% yield).

The salt is converted to the corresponding polyamide by the following procedure: 400 parts of the sebacic acid salt of bis(4-aminocyclohexyl)methane and 50 parts of water are placed in an autoclave fitted with a removable aluminum liner, the autoclave is flushed with oxygen-free nitrogen, evacuated, and oxygen-free nitrogen is then admitted. The autoclave is sealed and heated under autogenous pressure over a period of one and three-quarter hours to a polymerization temperature of 220° C. and a pressure of 250 lbs./in.² The temperature is raised to 276° C. during the next three-quarters of an hour while the pressure is maintained at 250 lb./in.² by bleeding off excess gases as required. The internal pressure is then released over a period of fifteen minutes, while the temperature is increased to 293° C. The temperature of the polymer is gradually increased to 322° C. over a period of two and one-quarter hours at atmospheric pressure under an atmosphere of oxygen-free nitrogen and held under these conditions for one-half hour. The autoclave is then evacuated to a pressure of 8 mm. absolute and heated to 320° to 330° C. for one-half hour. After cooling to room temperature under an atmosphere of nitrogen, the autoclave is opened and the polyamide obtained as a hard, white, tough cylinder (350 parts) possessing a softening point of 248° C. and an intrinsic viscosity $[\eta]$ 0.89.

While the polyamide is obtained in an opaque state under conditions of slow cooling such as are encountered in the foregoing autoclave preparation, the polyamide may be converted to a transparent, colorless form by injection molding under suitable conditions. This change of form is believed to be due to the rapid quenching of the molten polyamide encountered under these conditions with subsequent decrease in the degree of crystallinity of the polymer. This polymer is found to be insoluble in the usual organic solvents, and especially in mixtures of methanol and methylene chloride or chloroform.

*Example V*

Variations in the geometric isomer content of bis(4-aminocyclohexyl)methane, as indicated by the freezing point of the diamine, are reflected in the properties of polyamides derived therefrom with sebacic acid. This is illustrated as follows:

A. A solution of 10.52 parts of bis(4-aminocyclohexyl)methane, freezing point 60.7° C. (described as the solid fraction in Example II) in 39.5 parts of absolute ethanol is added to a hot solution of 10.11 parts of pure sebacic acid in 39.5 parts of absolute ethanol, 16 parts of absolute ethanol is added, the mixture is cooled to room temperature and allowed to stand at approximately 6° C. overnight. The precipitated sebacic acid salt of bis(4-aminocyclohexyl)methane is filtered, washed with absolute ethanol and dried; 20.6 parts being obtained.

To convert the sebacic acid salt of bis(4-aminocyclohexyl)methane to the polyamide, 10 parts of the salt is placed in a glass bomb tube, the air is replaced by oxygen-free nitrogen, the tube evacuated and is sealed, heated at 210° C. for 1 hour, and then heated at 330° C. at atmospheric pressure under an atmosphere of oxygen-free nitrogen for 3 hours. The clear viscous melt of the polyamide upon cooling sets to a white, opaque, solid possessing a softening point of 272° C. and an intrinsic viscosity $[\eta]$ 0.73. This polyamide is insoluble in methanol/chloroform mixtures.

B. The liquid isomer mixture of bis(4-aminocyclohexyl)methane, freezing point 18.5° C. (described as the liquid fraction in Example II) yields a polyamide with sebacic acid under the foregoing conditions in the form of a hard, tough, semi-transparent solid softening at 220–225° C., intrinsic viscosity $[\eta]$ 0.85.

C. Bis(4-aminocyclohexyl)methane in the form of a geometric isomer mixture which is normally liquid at room temperature, freezing point approximately 7–5° C., and prepared essentially by the method disclosed in our copending application, Serial Number 615,912, filed September 12, 1945, is converted to a polyamide with sebacic acid under conditions essentially similar to the foregoing. The resulting polyamide is a transparent, tough solid, softening at 200–203° C., intrinsic viscosity $[\eta]$ 0.99. This polyamide is soluble in a mixture of methanol and methylene chloride or chloroform to yield clear, colorless solutions suitable for film casting.

The isomeric bis(4-aminocyclohexyl)methanes of this invention which freeze above 40° C. are unique as compared to mixtures of bis(4-aminocyclohexyl)methanes having a lower freezing point in that they yield polyamides of remarkably increased softening point. A remarkable property of the products of this invention is that though they yield polyamides which are initially opaque, upon injection molding products are obtained which are transparent and have very excellent optical properties.

As many apparently widely different embodiments of this invention may be made without departing from the spirit and scope thereof, it is to be understood that the invention is not limited to the specific embodiments thereof except as defined in the appended claim.

We claim:

Bis(4-aminocyclohexyl)methane having a freezing point between 40° and 65.4° C.

WILLIAM KIRK, Jr.
RICHARD S. SCHREIBER.
GERALD M. WHITMAN.

REFERENCES CITED

The following references are of record in the file of this patent:

Balas et al.: "Collect on Czechoslovak Chem. Commun.," v. 3, pp. 171–176 (1931).